United States Patent [19]

Elliott

[11] 4,134,366

[45] Jan. 16, 1979

[54] ANIMAL SORTER

[76] Inventor: John L. Elliott, Alvo, Nebr. 68304

[21] Appl. No.: 808,113

[22] Filed: Jun. 20, 1977

[51] Int. Cl.[2] .......... A01K 29/00

[52] U.S. Cl. .......... 119/155

[58] Field of Search .......... 119/155; 209/121

[56] References Cited

U.S. PATENT DOCUMENTS

| | | | |
|---|---|---|---|
| 2,515,063 | 7/1950 | Stanchfield | 119/45 R |
| 2,715,387 | 8/1955 | Marmet | 119/155 |

*Primary Examiner*—Hugh R. Chamblee

*Attorney, Agent, or Firm*—Vincent L. Carney

[57] ABSTRACT

To sort animals by their weight, a moveable chute within an animal sorter is held at an elevated position by a counterbalance and rests upon rails which permit it to move to a lower position against the weight of the counterbalance when animals on the chute exceed the weight of the counterbalance. A single entrance permits animals to enter the chute while it is in the elevated position and pass through it to one exit if they are of a weight less than the weight of the counterbalance. The chute moves downwardly and laterally to its second position to be aligned with a second exit if the animal is heavier than the counterbalance.

8 Claims, 5 Drawing Figures

ANIMAL SORTER

This invention relates to animal sorters.

In one class of animal sorter, the animals are forced along a chute containing a scale. They are weighed on the scale and then, in accordance with their weight, are sorted into different pens. In another class of animal sorter, animals are automatically sorted by forcing them to move through a chute which permits animals of only a certain dimension to pass.

In the prior art animal sorters of the first type, the animals are manually sorted by an operator who reads the scale and forces the animals into the proper pen. In the second type of prior art animal sorters, the animals are automatically sorted by forcing them through a chute having only fixed size gates so that the smaller animals pass through the smaller gates but not the larger animals, thus sorting the smaller animals from the larger animals.

The prior art sorters of the first type have the disadvantage of requiring the operator to maintain the animal on the scale and forcing the animal into the proper pen. The prior art animal sorters of the second type have the disadvantages of sorting by size instead of by weight and of being dependent upon the willingness of the animal to squeeze through a small gate. This attitude of the animal is independent of both size and weight.

Accordingly, it is an object of the invention to provide a novel animal sorter.

It is a further object of the invention to provide an animal sorter which is automatic in operation and sorts in accordance with the weight of the animals.

It is a still further object of the invention to provide an animal sorter which requires a minimum amount of human operation.

It is a still further object of the invention to provide an animal sorter which is relatively inexpensive and adaptable to the sorting of a wide range of weights of animals.

In accordance with the above and further objects of the invention, an animal sorter is provided having mounted within it a moveable chute. The chute is mounted on rollers to inclined guideways and held in an elevated position at one side of the sorter by a counterweight and pulley system. The sorter has one entrance on one side and two exits, spaced from each other, on the other side.

In its elevated position, the chute is aligned with the single entrance and with one of the two lighter so that animals, that are ligher in weight than the counterweight, pass through the chute from the single entrance to one of the two exits. However, if an animal heavier than the counterweight enters the chute, the chute moves downwardly and laterally on the inclined guideways so that it is aligned with the second exit of the sorter, thus permitting the animal to pass through the second exit. The first and second exits are aligned with different pens so that animals may be sorted into the pens in accordance with their weights.

From the above description, it can be understood that the animal sorter of this invention has the advantages of being simple in construction, inexpensive, capable of sorting animals by weight and requiring a minimal amount of human intervention for the sorting of the animals.

The above noted and other features of the invention will be better understood from the following detailed description when considered with reference to the accompanying drawings in which.

Figure 1:
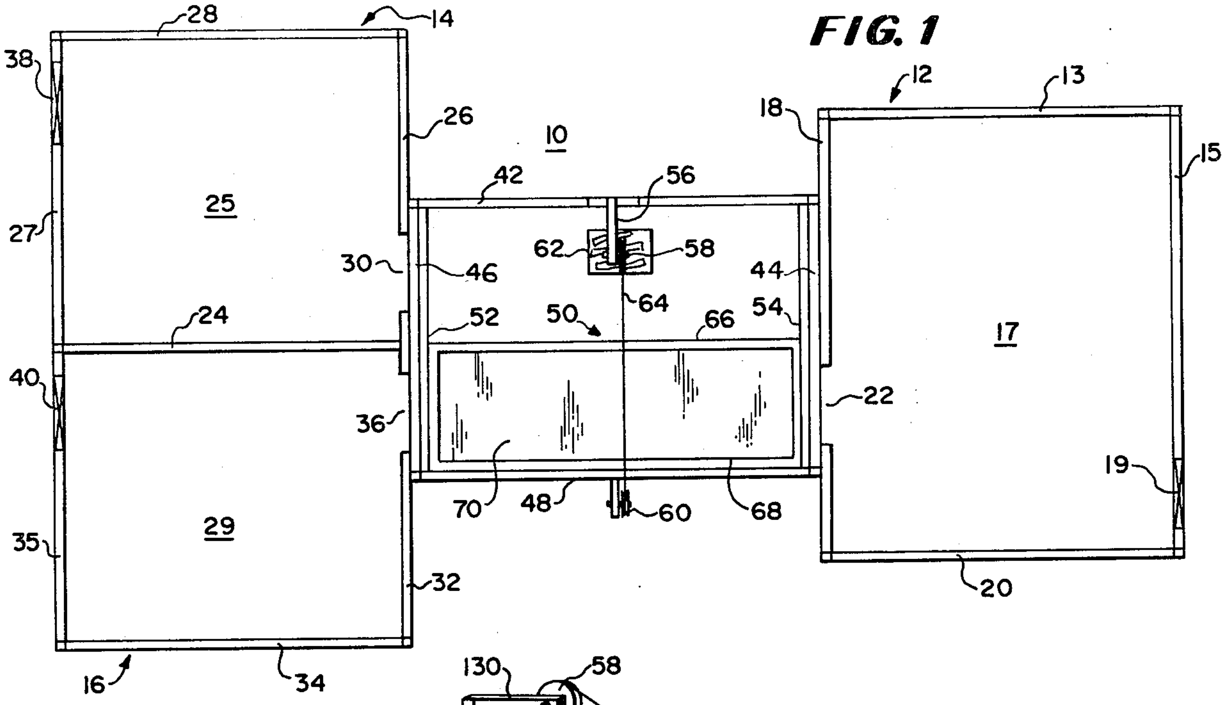
FIG. 1 is a plan view of an embodiment of the invention.

In FIG. 1, there is shown in a plan view one embodiment of an animal sorter 10 positioned between a first pen 12 for containing the animals to be sorted and second and third pens 14 and 16 to receive the animals to be sorted.

To hold the animals before they are sorted, the pen 12 includes four fences 13, 15, 18 and 20 forming an enclosure 17 for holding the animals. A first gate 19 is provided to permit the animals to enter the enclosure 17 where they are contained by the side fences enclosing it and a second opening 22 is positioned against the sorter 10 to permit the animals to be forced through the sorter 10.

To receive the animals after they are sorted, the two pens 14 and 16 are positioned adjacent to each other and on the opposite side of the sorter 10 from the pen 12. The pen 14 includes three side fences 26, 28 and 27 and the pen 16 includes three side fences 32, 34 and 35 with a common side fence 24 forming the fourth side of the pens 14 and 16 to form enclosure 25 in the pen 14 and enclosure 29 in the pen 16.

To permit animals to be driven from the enclosures 25 and 29, the fence 27 in the pen 14 includes a gate 38 and the fence 35 in the pen 16 includes a gate 40. An opening 30 in the fence 26 is aligned with an opening on one side of the end of the sorter 10 abuting the pen 14 to permit heavier animals to pass from the sorter 10 into the enclosure 25 of the pen 14 and an opening 36 in the fence 32 is aligned with another opening on the other side of the end of the sorter 10 abuting the pen 16 to permit lighter animals to pass from the sorter 10 into the enclosure 29 of the pen 16.

To sort animals by weight, the animal sorter 10 includes four screened side walls 42, 44, 46 and 48 and a moveable chute 50 mounted within the screened walls. The moveable chute 50 includes rollers which rest upon guideways or rails 52 and 54 for sliding motion between a position aligned with opening 36 and a position aligned with the opening 30.

The chute 50 is normally biased to be aligned with the opening 36 by a pulley system including a first support 56, a first pulley 58, a second pulley 60, a counterweight 62 and a rope 64 which connects the counterweight 62 to the chute 50 over the pulleys 58 and 60 to pull the chute 50 to its upward position by the weight of the counterweight 62 unless it is weighted downwardly by an animal. To support an animal, the chute 50 includes side members 66 and 68 and a bottom floor 70.

In operation, animals to be sorted by weight are forced one by one through the opening 22 from the enclosure 17 of the pen 12 onto the chute floor 70. Light animals move across the chute to the opening 36 and enter the enclosure 29 of the pen 16. However, heavier animals cause the chute 50 to move downwardly to a position where it is aligned with the opening 30 and the animals enter the enclosure 25 of the pen 14.

While three pens 12, 14 and 16 are shown in FIG. 1, it is not necessary to use such enclosures to practice the invention. Animals may be forced one by one into the sorter and removed by hand or the pens 25 and 29 may be used but the animals may be forced into the sorter 10 through another chute.

Figure 2:
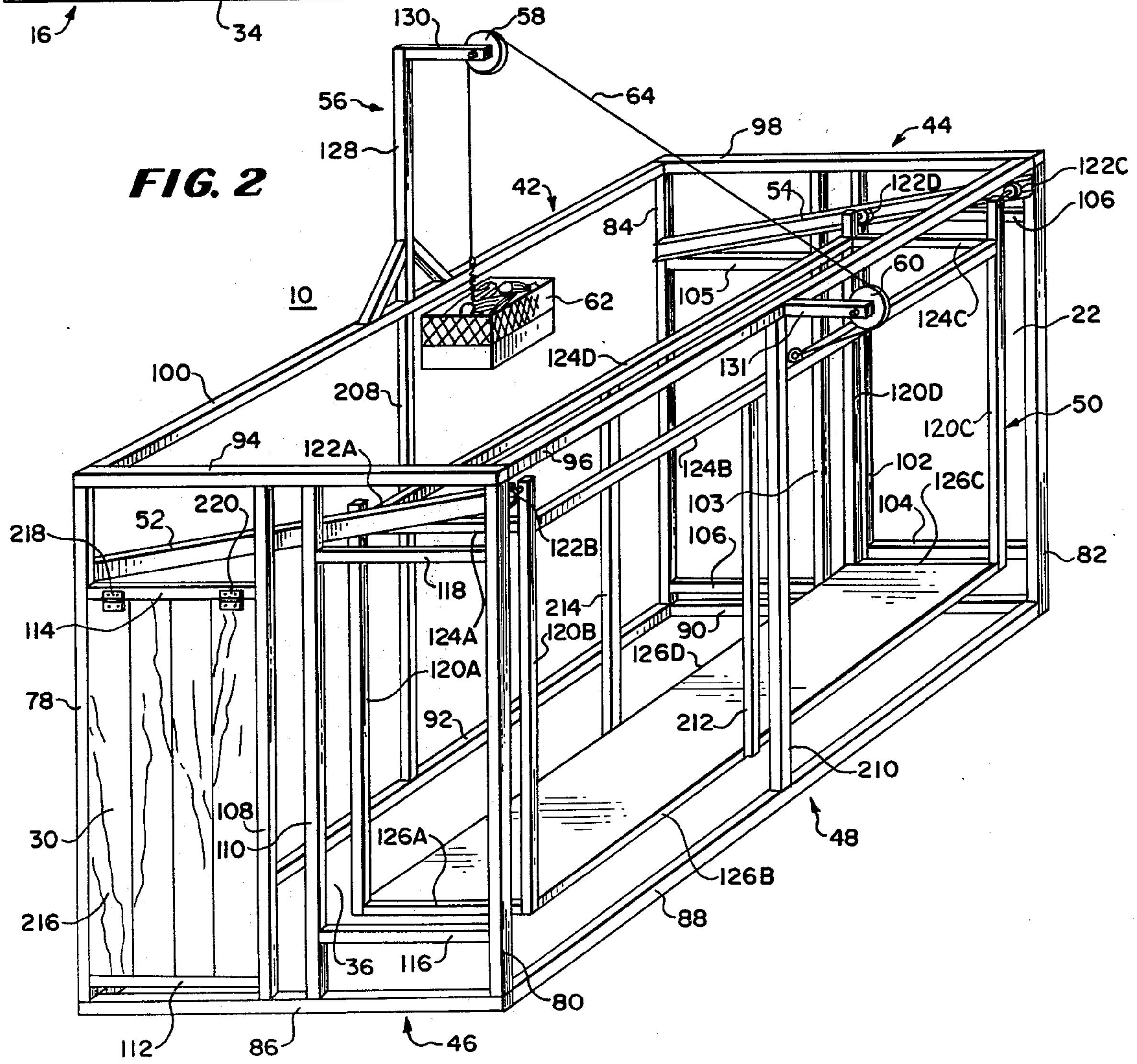
FIG. 2 is a simplified perspective view of an embodiment of the invention.

In FIG. 2, there are shown framing members of the sorter 10 and the chute 50 with the chute 50 in its uppermost position and the entrance and exit of the chute 50 aligned with the entrance 22 and exit 36 respectively of the sorter 10. The wall portions of the sorter and the chute within the sorter have been omitted in this figure for clarity although it should be understood that certain portions are covered by wire screens or boards to prevent the escape of animals as will be better explained hereinafter.

As best shown in FIG. 2, the animal sorter 10 includes four vertical corner posts 78, 80, 82 and 84, four lower or base horizontal framing members 86, 88, 90 and 92, two center studs 208 and 210 and four upper horizontal framing members 94, 96, 98 and 100, with: (1) the side 46 including vertical corner posts 78 and 80, lower horizontal framing member 86 and upper horizontal framing member 94; (2) the side 48 including vertical corner posts 80 and 82, center stud 210, lower horizontal framing member 88 and upper horizontal framing member 96; (3) the side 44 including vertical corner posts 84 and 82, lower horizontal framing member 90 and upper horizontal framing member 98; and (4) the side 42 including vertical corner posts 78 and 84, center stud 208 and lower horizontal framing member 92 and upper horizontal framing member 100.

To form the entrance 22, a vertical post 102 is mounted between the lower horizontal framing member 90 and the upper horizontal framing member 98 and spaced from the vertical corner post 82 a sufficient distance to permit passage of an animal therebetween. Between the vertical posts 102 and 82 are two horizontal supporting members 104 and 106 forming the top and bottom of the entrance 22 and positioned so that they will be aligned with the chute 50 when it is in its forwardmost position. To provide support for side 44 and to enable screen or boards to be easily attached for closing all but the entrance 22, a center vertical support post 103 is mounted to horizontal framing members 90 and 98 between vertical framing members 84 and 102. Horizontal braces 105 and 106 are mounted between framing members 84 and 103 for further support.

To form the exits 30 and 36, two vertical posts 108 and 110 are mounted parallel to each other between the lower horizontal framing member 86 and the upper horizontal framing member 94 in the side 46. The vertical member 108 is spaced from the vertical corner post 78 to form the sides of the exit 30 and the vertical support member 110 is spaced from the vertical corner post 80 to form the sides of the exit 36, with the sides of each exit being a sufficient distance from each other to permit animals to pass between them.

Between the vertical corner post 78 and the vertical supporting member 108 are fastened two parallel horizontal support members 112 and 114 forming the bottom and top respectively of the exit 30; and between the vertical support member 110 and the vertical corner post 80 are fastened two horizontal support members 116 and 118 forming the bottom and top respectively of the exit 36. The horizontal and vertical support members forming the exits 30 and 36 are positioned so that the exit 36 is aligned with the chute when the chute is in its uppermost and most forwardly position and the exit 30 is aligned with the chute when the chute is in its lowest and most rearwardly position.

The size of the entrance 22 and the exits 30 and 36 varies from sorter to sorter depending on the type of animal. The preferred embodiment is intended for sorting swine and the size of its entrance and exits are such as to permit ready passage of swine through the sorter. However, other sorters may have different dimensions when used to sort other types of animals. To prevent animals from entering the exit 30 from the pen 25 when the chute 50 is aligned with the entrance 22, a door 216 is mounted to horizontal support member 114 by hinges 218 and 220 so as to swing outwardly but not inwardly. A similar door may be mounted over exit 36 but is not as important since the chute is normally aligned with this exit.

While in FIG. 2 only the framing members are shown, in the actual embodiment the portions other than the entrance and exits are closed with screens or boards at least to a height sufficient to prevent the animals from escaping. In one embodiment, the sections between vertical posts 108 and 110, 80 and 82 and 84 and 78 are covered by screens and the sections between vertical posts 102 and 84 with a board, up to a reasonable height for the particular animal. To aid in supporting the side closing members, the stud 210 is mounted centrally to side 48 with one end being fastened to the lower horizontal framing member 88 and the other end mounted to the upper horizontal framing member 96 and stud 208 is mounted centrally to side 42 with one end being fastened to the lower horizontal framing member 92 and the other end to the upper horizontal framing member 100.

The chute 50 includes four vertical support members 120A–120D each having mounted to it: (1) a corresponding one of the rollers 122A–122D at its upper end; (2) one end of each of two upper horizontal bracing members 124A–124D at its top; and (3) one end of each of two bottom horizontal bracing members 126A–126D at its bottom. The rollers 122A and 122B are positioned to roll within the guide rail 52 and the rollers 122C and 122D are positioned to roll within the guide rail 54 so as to permit the chute to move from its uppermost and forwardly position to its lowest and rearwardly position. Vertical support 212 connects the upper horizontal bracing member 124B to the bottom horizontal bracing member 126B and vertical support 214 connects the upper horizontal bracing member 124D to the bottom horizontal bracing member 126D.

While in FIG. 2 the sides of the chute 50 are shown as being open, in an actual embodiment, the two sides between vertical posts 120B and 120C and between 120A and 120D are covered to a sufficient height to form a chute capable of constraining animals when passing between the entrance 22 and exits 30 and 36 of the chute.

To permit movement of the chute 50 between its forward position adjacent to side 48 as shown in FIG. 2 to its rearwardly position adjacent to side 42, the two pulleys 58 and 60 are mounted in a plane with the rope 64 over them and connected at one end to the counterbalance 62 and at its other end to the chute 50. To support the pulley 58, the support member 56 includes a vertical upstanding post 128 and a horizontal arm 130 upon which the pulley 58 is rotatably mounted. The pulley 60 is rotatably mounted to the upper horizontal framing member 96 by horizontal support arm 131. The rope 64 extends between the counterbalance 62 over the pulley 58, around the pulley 60 and is connected to the upper horizontal bracing member 124*B* of the chute 50 so that the weight of the counterbalance 62 pulls the chute 50 to its forward position. Consequently, when the weight of an animal within the chute 50 is greater than the weight of the counterbalance 62, the chute 50 moves downwardly to its rearward position, with the rollers 122A–122D rolling within the guides 52 and 54 so that the heaviest animal leaves the chute 50 through exit 30. If an animal's weight is not greater than the counterbalance 62, the animal leaves the chute 50 through exit 36.

The counterbalance may be of any type such as, for example, a holder for standard weights or the like used with measuring devices or a container filled with weight objects to the desired weight or the like. In the preferred embodiment, the counterbalance 62 is a basket which receives weights, preweighed pieces of wood or bricks or the like. The amount of weight is selected to permit the lightest animals in pen 12 to move individually across the chute 50 without causing it to move to its lower position. Later, the remaining animals are run through with a counterbalance having a different weight to separate them into other groups. This process is continued with different weights until a proper and complete sorting of the animals has been made.

Although, in the preferred embodiment, a chute is disclosed which moves from a higher elevation to a lower elevation to align itself with different exits, other arrangements are possible. For example, the motion of the chute from a higher elevation to a lower elevation may be vertical instead of angular and open a gate to a different height in accordance with its position at the higher or the lower level. Moreover, although a counterbalance arrangement is utilized in the preferred embodiment to differentiate between animals of different weights, other arrangements such as springs or the like may be used for this purpose and gates of different sizes may be moved laterally to align with the chute instead of the chute moving laterally to fixed gates.

Figure 3:
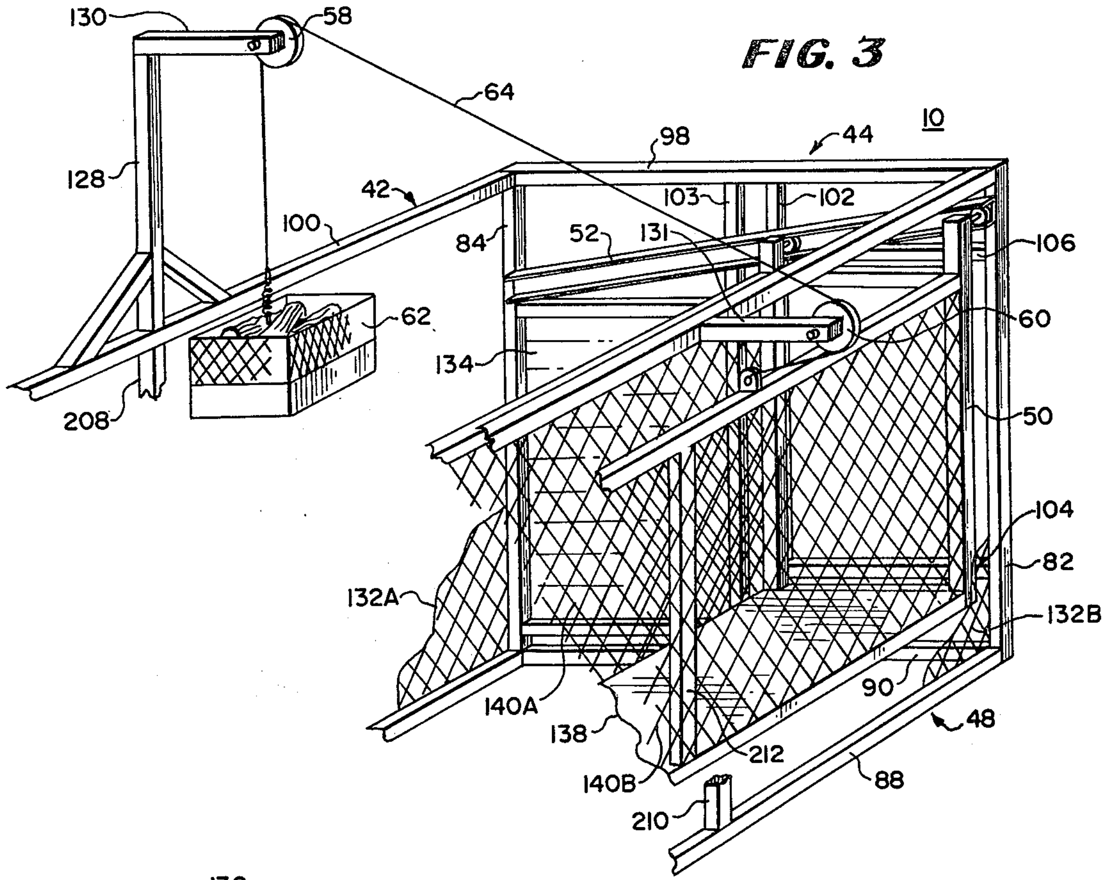
FIG. 3 is a fragmentary perspective view of an embodiment of the invention.
Figure 4:
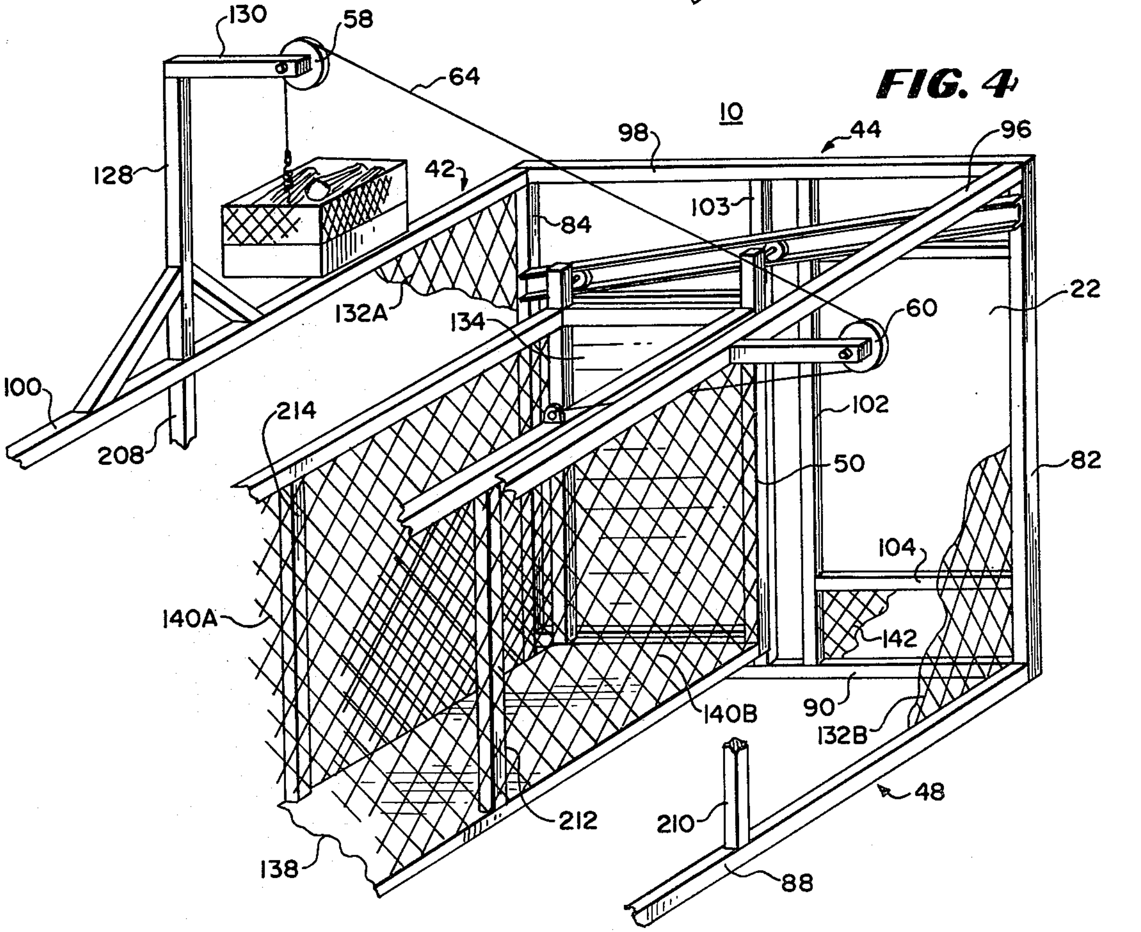
FIG. 4 is another fragmentary perspective view of an embodiment of the invention.

In FIGS. 3 and 4, there is shown in fragmentary perspective views, a portion of the sorter of FIGS. 1 and 2 having screen 132A on side 42 and screen 132B on side 48, boards 134 between the corner post 84 and the vertical post 102, floorboards 138 forming the floor of the chute 50, and side screens 140A and 140B of the chute 50. These screens and boards prevent the escape of animals.

The chute 50 is shown in FIG. 3 in its forward position ready to receive swine or containing an animal weighing less than the counterweight 62. On the other hand, the chute 50 is shown in FIG. 4 in its rearward position against the side 42 where it is moved by a relatively heavy animal.

As best shown in these two views, the space between the vertical post 102 and the corner post 84 is closed by boards 134 so that swine cannot enter the animal sorter 10 from the pen 12 without passing through the chute 50. Similarly, the space between the horizontal support 104 and the bottom horizontal board 90 is closed by the screen 142. Screen is also used between vertical post 108 and the vertical post 110 and the horizontal support 116 and the horizontal bottom support 86 (FIG. 2) to prevent animals from entering the sorter from the pens 14 and 16 after being sorted.

Figure 5:
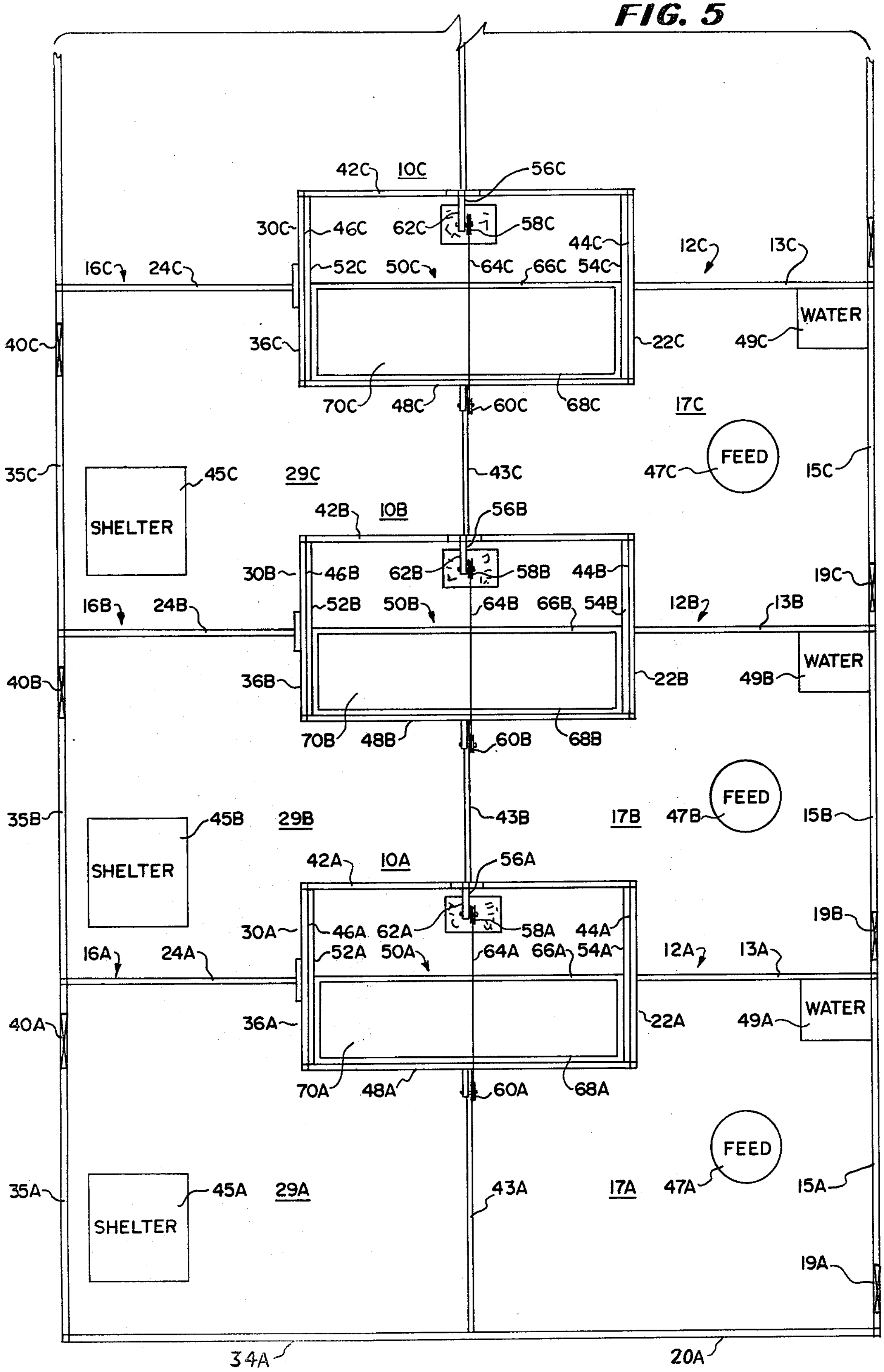
FIG. 5 is a plan view of another embodiment of the invention.

In FIG. 5, there is shown in plan view another embodiment of the invention having a plurality of animal sorters 10A–10C, pens 16A–16C and pens 12A–12C, of the type shown in FIG. 1 having correspondingly-numbered parts with the suffixes A, B and C added to differentiate between the pens. The sorters 10A–10C, pens 124A–12C and pens 16A–16C are arranged to permit continuous and automatic sorting of animals.

The sorters 10A–10C are placed between pens 16A–16C 12*C*, pens 12A–12C, the pens being separated by fences 13A–13C and 24A–24C. These pens separate each group of animals according to their weight. The counterbalance in the sorter 10B is heavier than that in sorter 10A and the counterbalance in sorter 10C is heavier than that in sorter 10B so that the sorters 10A–10C actuate at successively heavier weights.

The entrance 22A in sorter 10A permits lighter animals from pen 12A to enter the chute while it is in the elevated position and pass through to exit 36A into pen 16A. Lighter animals are encouraged to pass through the sorter 10A from pen 12A into pen 16A by having shelter located in pen 16A and feed and water in pen 12A and the continuous movement back and forth causes the animals to become accustomed to passing back and forth through the sorter 10A.

When the animals reach the desired weight and pass through the entrance 22*A* onto the chute, the chute moves downwardly to a position where it is aligned with the exit 30*A*, whereby the animals enter into the pen 16B. This sorting process continues as the animals pass from sorter 10B onto 10C when they are still heavier.

As can be understood from the above description, the animal sorter of this invention has the advantages of: (1) enabling separation of animals by weight rather than by size; (2) being inexpensive and easy to construct; and (3) not being dependent on the ability or willingness of the animal to squeeze through a relatively small space.

Although a preferred embodiment of the invention has been described with some particularity, many modifications and variations of the invention are possible in the light of the above teachings. Accordingly, it is to be understood that, within the scope of the appended claims, the invention may be practiced otherwise than as specifically described.

What is claimed is:

1. Animal sorting means including:

a housing;

said housing having one housing entrance and first and second housing exits;

a chute having a chute entrance and a chute exit;

said chute being biased into a position within said housing in which said chute entrance is aligned with said housing entrance and said chute exit is aligned with one of said first and second housing exits; and means for moving said chute between said position in which said chute entrance is aligned with said housing entrance and said chute exit is aligned with said one of said first and second exits to a position in which said chute exit is aligned with said other of said first and second housing exits when said chute holds a weight greater than a predetermined weight.

2. Animal sorting means according to claim 1 in which said chute includes weight-actuated means for moving said chute between said second and first positions.

3. Animal sorting means according to claim 2 in which said weight-actuated means includes a counterbalance and pulley and said chute rests upon a guideway that permits motion from a higher elevation to a lower elevation.

4. Animal sorting means according to claim 1 in which said means for moving includes guide means for guiding said chute from one position to another.

5. An animal sorter according to claim 4 in which:

said guide means includes a pair of elongated guides supporting said chute; and said guide means being positioned at an angle, whereby said chute may move between a higher location and a lower location on said guides.

6. An animal sorter according to claim 5 in which said counterbalance includes a container adapted to receive objects having predetermined weights, whereby the weight of said counterbalance may be adjusted by adding objects to said container or removing objects from said container.

7. An animal sorter according to claim 6 further including a hinged door over said other of said first and second housing exits mounted to open from the inside of said housing outwardly and barred from swinging inwardly, whereby said animals may leave said housing through said other of said first and second housing exits but may not enter said housing through said other of said first and second housing exits.

8. A multiple stage animal sorting combination including an animal sorter according to claim 7 and further comprising:

at least one other animal sorter substantially identical to said first-mentioned animal sorter;

first, second, third, and fourth animal pens defined by fencing;

said first pen being formed by fencing forming an enclosure together with a portion of said first-mentioned animal sorter and enclosing said housing entrance of said first-mentioned animal sorter within said fencing;

said second pen being formed of fencing forming an enclosure with a portion of said first-mentioned animal sorter and enclosing said one of said first and second housing exits of said first-mentioned animal sorter;

said third pen being formed of fencing forming an enclosure which includes said other of said first and second housing exits of said first-mentioned animal sorter and said one of said first and second housing exits of said other animal sorter;

said fourth pen comprising fencing forming an enclosure including a housing entrance of said other animal sorter.

* * * * *

UNITED STATES PATENT AND TRADEMARK OFFICE

CERTIFICATE OF CORRECTION

PATENT NO. : 4,134,366

DATED : January 16, 1979

INVENTOR(S) : John L. Elliott

It is certified that error appears in the above-identified patent and that said Letters Patent are hereby corrected as shown below:

Column 1, line 50, change the word "lighter" to "exits".

Column 6, line 5, change "124A-12C" to "12A-12C".

Column 6, line 8, after 16A-16C, delete "12C," insert -- and --.

Signed and Sealed this

*Fifth* Day of *June 1979*

[SEAL]

*Attest:*

RUTH C. MASON
*Attesting Officer*

DONALD W. BANNER
*Commissioner of Patents and Trademarks*